United States Patent [19]

Katsurada

[11] Patent Number: 4,811,412
[45] Date of Patent: Mar. 7, 1989

[54] METHOD OF A SYSTEM FOR ANALYZING CHARACTERS

[75] Inventor: Morihiro Katsurada, Nara, Japan

[73] Assignee: Sharp Kabushiki Kaisha, Osaka, Japan

[21] Appl. No.: 142,867

[22] Filed: Jan. 11, 1988

[30] Foreign Application Priority Data

Jan. 26, 1987 [JP] Japan ................................ 62-15576

[51] Int. Cl.<sup>4</sup> ............................................... G06K 9/34
[52] U.S. Cl. ........................................... 382/9; 382/57; 382/47
[58] Field of Search ............................... 382/9, 47, 57

[56] References Cited

U.S. PATENT DOCUMENTS 3,199,080  8/1965  Rabinow ................................ 382/57
3,201,751  8/1965  Rabinow ................................. 382/9
4,003,023  1/1977  Benson et al. .......................... 382/9
4,408,342 10/1983  Grabowski et al. ..................... 382/9
4,654,873  3/1987  Fujisawa ................................ 382/9

Primary Examiner—Leo H. Boudreau
Assistant Examiner—Donald J. Daley
Attorney, Agent, or Firm—Flehr, Hohbach, Test, Albritton & Herbert

[57] ABSTRACT

After an optical character reader scans a line and image data corresponding thereto are stored, vacant regions perpendicular to the direction of the line are identified. Thereafter, candidate character positions are identified firstly by starting from the beginning of the line and secondly by starting from the end thereof. If the results of the two analyses coincide, they are identified as character positions where neighboring characters are separated. If they do not, a pattern matching method is used with stored patterns at each candidate character position to determine whether it really represents a character position.

2 Claims, 2 Drawing Sheets

FROM k=0

FROM k=m

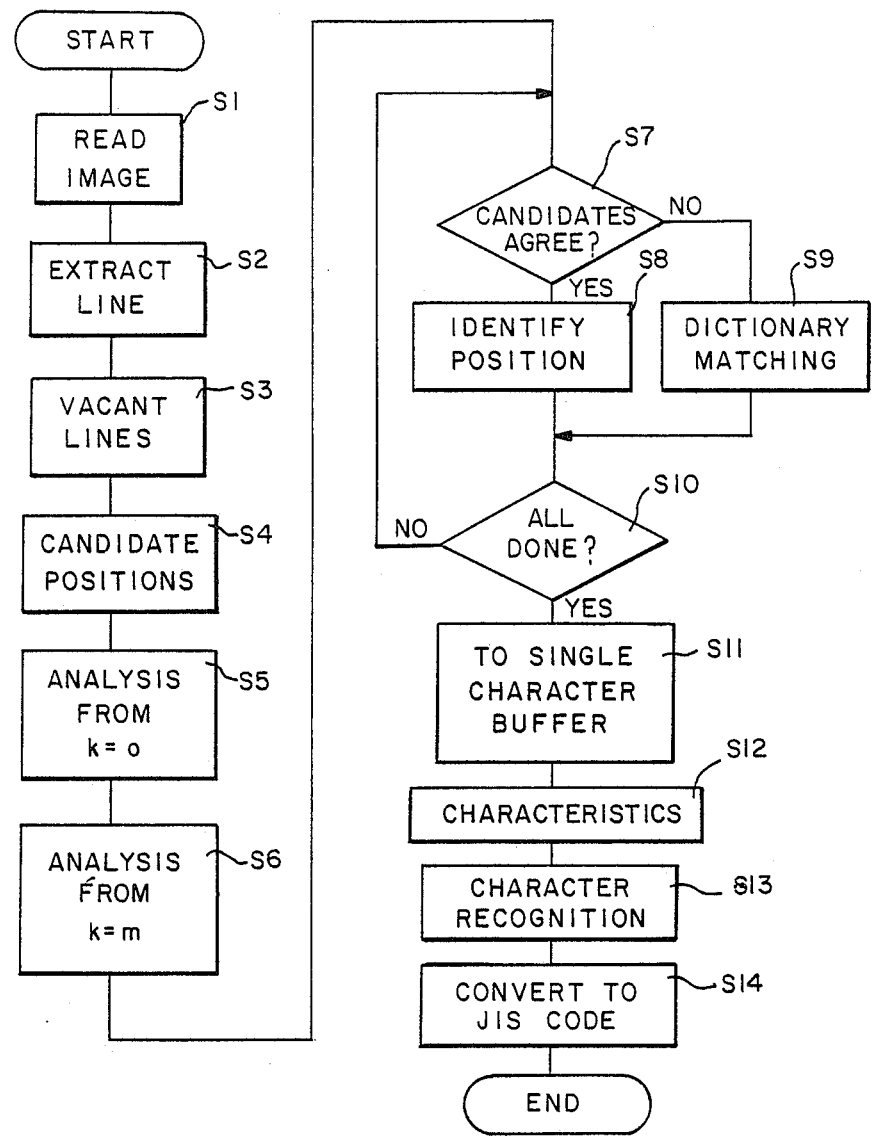
FIG.—1

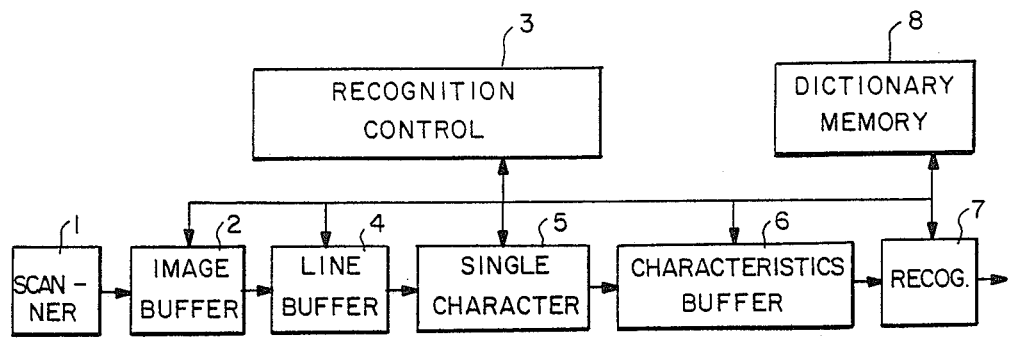
FIG.—2
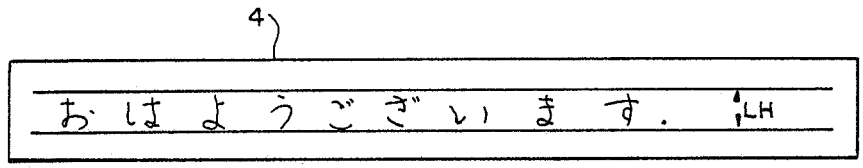
FIG.—3
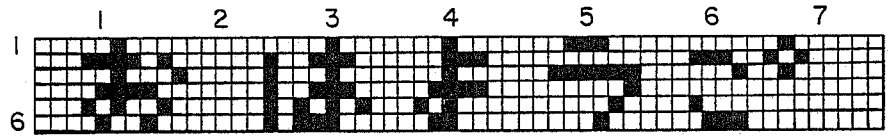
FIG.—4
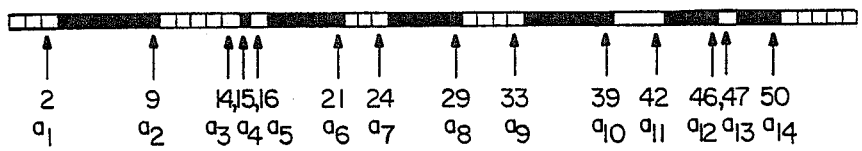
FIG.—5
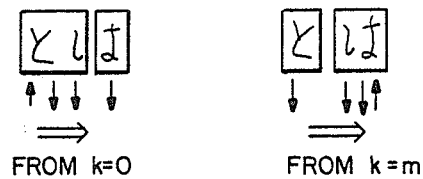
FIG.—6A    FIG.—6B

METHOD OF A SYSTEM FOR ANALYZING CHARACTERS

BACKGROUND OF THE INVENTION

This invention relates to a method of and system for analyzing characters in connection with an optical character reader or the like adapted to extract characters from character image data and to convert them into character code data.

In the process of character recognition whereby characters are extracted from character image data, a so-called pattern matching method is frequently used whereby a candidate character is determined by calculating the distances between an input character pattern and dictionary patterns. According to one of the methods of extracting a character, line image data are extracted from character image data in an image memory and stored in a line image buffer memory and if a vacant region is detected in the direction perpendicular to the direction of the line, this vacant region is considered as the position of a boundary between two characters. With this method, however, if a character is not correctly extracted from an inputted character array, such character is not registered as a dictionary pattern and hence cannot be correctly analyzed. For example, some characters such as Chinese characters (kanji) having a left-hand radical and a right-hand radical are not continuous but can be separated into parts in horizontal direction. Some other characters are similarly separable in vertical directions. If positions of boundaries between two neighboring characters are to be recognized by detecting a vacant region as described above, the left-hand and right-hand radicals of a single character may be extracted as two separate characters.

SUMMARY OF THE INVENTION

It is therefore an object of the present invention to provide a method of and a system for analyzing characters by which such separable characters can be correctly extracted.

An apparatus for character recognition embodying the present invention which achieves the above and other objects extracts line image data from character image data in an image memory, stores them in an image buffer memory, further extracts individual characters from such line image data and analyzes characters by matching the characteristics extracted from such individual characters with preliminarily stored data on characteristics. The line image data stored in the line image buffer memory are used to determine where vacant regions are in the direction perpendicular to the line direction. Thereafter, candidate character positions are identified firstly by starting from the beginning of the line and secondly by starting from the end of the line. If the results of the two analyses coincide, they are identified as character positions. If they do not, a pattern matching method is used with stored patterns at each candidate character position to determine whether it really represents a character position.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 1 is a flow chart of a character reader embodying the present invention,

FIG. 2 is a block diagram of an optical character reader embodying the present invention, FIG. 3 is an example of line image in a line buffer, FIG. 4 is an example of line image for character recognition, FIG. 5 is a drawing for showing the detection of vacant regions, and FIGS. 6A and 6B are drawings showing an example wherein candidate character positions do not match when the analysis is started from the left and from the right.

DETAILED DESCRIPTION OF THE INVENTION

The present invention is briefly described first by way simultaneously of the block diagram in FIG. 2 of a optical character reader which embodies it and of the flow chart in FIG. 1 for its operation. After an original document to be read is placed on a document table made of a glass material, a scanner 1 is activated and the document is read by a line sensor. The analog signals outputted from the line sensor are converted into digital signals which are then converted into binary data. After the entire document has thus been read by the line sensor (S1), the binary image data obtained by the scanner 1 are temporarily stored in an image buffer 2. Numeral 3 in FIG. 2 indicates a recognition control unit which includes a microprocessor and serves to extract lines from the binary pattern stored in the single buffer 2 as will be explained in detail below. Data corresponding to an extracted line are stored in a line buffer 4 (S2). Next, the recognition control unit 3 extracts individual characters from the binary pattern stored in the line buffer 4 (S3–S10) and stores them in a single-character buffer 5 (S11). Next, the recognition control unit 3 extracts characteristics from the binary pattern of each one of the extracted characters and stores these extracted characteristics in a single-character characteristics buffer 6 (S12). Next, the recognition control unit 3 transmits the characteristics stored in the single-character characteristics buffer 6 to a recognition unit 7 by which these characteristics are compared with dictionary patterns preliminarily stored in a dictionary memory 8 and characters are recognized by this pattern matching method (S13). Thereafter, the recognized character is converted into character code data (such as the JIS code, or the Japanese Industrial Standard Code) data and transmitted to an external apparatus (S14). Alternatively, the line buffer 4 and the single-character buffer 5 may be omitted and the processes performed by them may be carried out by the image buffer 2.

As briefly explained above, there may arise situations where a single character which is separable may be recognized as two separate characters if characters are identified merely on the basis of detected vacant regions. As will be described below, the present invention prevents the occurrence of such situations by quickly analyzing the coordinates of what may be hereinafter referred to as "candidate positions" of individual characters. The candidate position of a character is the position where characters are separated by a vacant region.

FIG. 3 shows an example of line image stored in the line buffer 4 (S2), representing a sentence ("good morning") in Japanese including nine kana characters "o", "ha", "yo", "u", "go", "za", "i", "ma" and "su". It is to be noted that some of these characters (such as "ha" and "go") are examples of aforementioned separable characters. The height of the line is represented by LH. FIG. 4 shows an example of reducing a portion of the line image of FIG. 3 into binary data by assigning "1" to each black area and "0" to each white area, one bit being assigned to each area. In this example, the line height LH is divided into six segments and eight bits in the direction of the line are together assigned a single address. Thus, the total area shown in FIG. 4 is represented by 6×7=42 addresses A(i,j) where i=1 ... 7 and j=1, ... 6. Vacant regions in the direction of the line height can be detected by calculating B(i)=A(i,1)$^v$A(i,2)$^v$... $^v$A(i,6) where "$v$" indicates a bit-wise logical sum and i=1 ... 7. The array B(i) thus obtained is shown in FIG. 5. For convenience, numbers 0–55 are assigned sequentially to the bits of B(i) from the first bit of B(1)=0 to the eighth bit of B(7)=55.

Next, the positions where the color changes in the sequence shown in FIG. 5 are analyzed. Each position at which white changes to black is identified as a candidate character start position (or UP) and each position at which black changes to white is identified as a candidate character end position (or DOWN). These positions are indicated by arrows in FIG. 5, their addresses being shown below the arrows. The addresses of these positions are stored (S4) as shown in Table 1.

TABLE 1

| h | \multicolumn{7}{c}{k} | | | | | | |
|---|---|---|---|---|---|---|---|
|   | 0 | 1 | 2 | 3 | 4 | 5 | 6 |
| UP | 2 | 14 | 16 | 24 | 33 | 42 | 47 |
| DOWN | 9 | 15 | 21 | 29 | 39 | 46 | 50 |

Next, the value of LH which is preliminarily determined and Table 1 are used to obtain a value of $j_{max}$ satisfying $$j_{max} = \max_{j \in N}\{j | (DOWN(k + j) - UP(k)) \leq a*LH\}$$

by starting from k=0 (or from the beginning of the line) where N is a natural number and $a$ is a positive constant and the area from UP(k) to DOWN (k+$j_{max}$) is tentatively considered as containing one character (S5). Table 2 shows combinations of UP and DOWN thus identified. Table 2 shows that the characters "ha" and "go" of FIG. 4 are identified as single characters although they are both separable.

TABLE 2

| h | \multicolumn{6}{c}{k} | | | | | |
|---|---|---|---|---|---|---|
|   | 0 | 1 | 2 | 3 | 4 | 5 |
| UP | 2 | 14 | 24 | 33 | 42 |   |
| DOWN | 9 | 21 | 29 | 39 | 50 |   |

After the number of individual characters thus identified (5 in Table 2) is stored (as m), a value of $j_{max}$ satisfying the condition $$j_{max} = \max_{j \in N}\{j | (DOWN(k) - UP(k - j)) \leq a*LH\}$$

is obtained next by starting from k=m (or from the end of the line) and the area between DOWN(k) and UP(k−$j_{max}$) is tentatively considered as containing one character. Table 3 shows combinations of DOWN and UP thus identified (S6).

TABLE 3

| h | \multicolumn{6}{c}{k} | | | | | |
|---|---|---|---|---|---|---|
|   | 0 | 1 | 2 | 3 | 4 | 5 |
| UP | 42 | 33 | 24 | 14 | 2 |   |
| DOWN | 50 | 39 | 29 | 21 | 9 |   |

In other words, one moves in two directions (forward and backward) to locate individual candidate character positions (Tables 2 and 3). If a candidate position is identified by both methods and the corresponding combination of UP and DOWN appears in both Table 2 and Table 3 (YES in S7), it is concluded that this is really a boundary between two different characters (S8). If the results do not match, that is, if a certain combination appears in Table 2 but not in Table 3 or in Table 3 but not in Table 2 (NO in S7), individual characteristic patterns are compared with dictionary patterns (S9). FIG. 3 shows an example wherein no disagreement results between Tables 2 and 3.

FIGS. 6A and 6B show an example wherein Tables 2 and 3 would disagree, that is, different candidate character positions are identified, depending on the direction in which character positions are detected. FIG. 6A shows a situation where character array with kana characters "to" and "ha" is studied from the left-hand side. Since character "to" is not separable but character "ha" has a down-stroke part on the left-hand side, three candidate character positions are identified when detected from the left-hand side. As shown in FIG. 6B, by contrast, the same character array, if the detection is started from the right-hand side, presents a different set of candidate character positions. Thus, neither set is immediately accepted as representing the true character positions and, as explained above, the pattern matching method is used with directory patterns at each of the tentatively identified candidate character positions. In the example described above, one finds, as a result of such pattern matching, that the candidate positions shown in FIG. 6B represent the actual boundary between the two characters. In summary, individual candidate character positions are analyzed twice, once in forward direction and again in backward direction, such that individual characters can be identified more accurately.

What is claimed is:

1. In a system for analyzing characters by extracting line image data from character image data in an image memory, storing said extracted line image data in a line image buffer memory, extracting individual characters in a line from said line image data, and identifying characters by matching characteristics from one of said extracted individual characters with preliminarily stored characteristics data, the improvement wherein said system further comprises:

candidate position detection means for analyzing said line image data stored in said line image buffer memory to determine whether character data are present or absent in a direction perpendicular to said line, thereby identifying starting and end positions of character data separated by vacant regions in said perpendicular direction and storing data indicative for said starting and end positions, first character position judging means for specifying a starting position from the beginning of a line, identifying the farthest end position in said line from said specified starting position within a specified range, identifying the area between said specified starting position and said identified farthest end position as a candidate character position, and repeating this process to the end of said line, second character position judging means for specifying an end position from the end of a line, identifying the farthest starting position in said line from said specified end position within a specified range, identifying the area between said identified farthest starting position and said specified end position as candidate character position, and repeating this process to the beginning of said line, and character position determining means for identifying, if said candidate positions identified by said first and second character position judging means match, said candidate character positions identified by said first and second character position judging means as an individual character position and extracting characteristics at each of said candidate positions; and identifying an individual character position by comparing said extracted characteristics with stored patterns in a dictionary memory if said candidate positions identified by said first and second character position judging means do not match.

2. A method of analyzing characters by extracting line image data from character image data in an image memory, storing said extracted line image data in a line image buffer means, extracting individual characters in a line from said line image data, and identifying characters by matching characteristics extracted from one of said extracted individual characters with preliminarily stored characteristics data, the improvement wherein said method further comprises the steps of:

analyzing said line image data stored in said line image buffer memory to determine whether character data are present or absent in a direction perpendicular to said line, thereby identifying starting and end positions of character data separated by vacant regions in said perpendicular direction and storing data indicative of said starting and end positions, specifying a starting position from the beginning of a line, identifying the farthest end position in said line from said specified starting position within a specified range, identifying the area between said specified starting position and said identified farthest end position as one of first candidate character positions, repeating the specifying and identifying steps described immediately above to the end of said line, specifying an end position from the end of a line, identifying the farthest starting position in said line from said specified end position within a specified range, identifying the area between said identified farthest starting position and said specified end position as one of said candidate character positions, repeating the specifying and identifying steps described immediately above to the beginning of said line, and identifying, if said first and second candidate character positions match, said matching first and second candidate character positions as an individual character position and extracting characteristics at each of said first and second candidate character positions; and identifying individual character positions by comparing said extracted characteristics with stored patterns in a dictionary memory if said first and second candidate character positions do not match.

* * * * *